United States Patent
Joo

(10) Patent No.: US 8,005,421 B2
(45) Date of Patent: Aug. 23, 2011

(54) CONNECTING APPARATUS, ELECTRONIC APPARATUS AND CONTROL METHOD THEREOF

(75) Inventor: Jae-il Joo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 697 days.

(21) Appl. No.: 11/698,054

(22) Filed: Jan. 26, 2007

(65) Prior Publication Data

US 2007/0259615 A1    Nov. 8, 2007

(30) Foreign Application Priority Data

May 4, 2006    (KR) .................. 10-2006-0040483

(51) Int. Cl.
  *H04Q 7/20*    (2006.01)
(52) U.S. Cl. ........ 455/7; 455/550.1; 455/3.01; 455/557; 455/3.06; 455/426.1; 370/310; 370/328; 370/329; 370/343
(58) Field of Classification Search ........... 455/7, 550.1, 455/557, 575.1, 412.1, 412.2, 466, 426.1, 455/426.2, 422.1; 370/310, 328, 329, 343
  See application file for complete search history.

(56) References Cited

U.S. PATENT DOCUMENTS

| | | | | |
|---|---|---|---|---|
| 7,200,397 | B1* | 4/2007 | Jones et al. | 455/436 |
| 7,277,547 | B1* | 10/2007 | Delker et al. | 380/270 |
| 2006/0208066 | A1* | 9/2006 | Finn et al. | 235/380 |
| 2006/0229100 | A1* | 10/2006 | Born | 455/557 |

FOREIGN PATENT DOCUMENTS

| | | |
|---|---|---|
| CN | 1549550 A | 11/2004 |
| CN | 1661581 A | 8/2005 |
| CN | 1722775 A | 1/2006 |
| KR | 10-2003-0058118 A | 7/2003 |
| KR | 10-2003-0085669 A | 11/2003 |
| KR | 10-2005-0116888 A | 12/2005 |

* cited by examiner

*Primary Examiner* — Keith T Ferguson
(74) *Attorney, Agent, or Firm* — Sughrue Mion, PLLC

(57) ABSTRACT

Disclosed are a connecting apparatus, an electronic apparatus and a control method thereof, the connecting apparatus, including: at least one connecting unit connectable to an outside device; a wireless-communicating unit which transmits or receives a wireless signal to or from an electronic apparatus; and a controller which receives information related to the outside device if the outside device is connected to the connecting unit, and which controls the wireless-communicating unit which outputs the information related to the outside device to the electronic apparatus through the wireless-communicating unit.

13 Claims, 3 Drawing Sheets

US 8,005,421 B2

CONNECTING APPARATUS, ELECTRONIC APPARATUS AND CONTROL METHOD THEREOF

CROSS-REFERENCE TO RELATED APPLICATIONS

This application claims priority from Korean Patent Application No. 2006-0040483, filed on May 4, 2006, in the Korean Intellectual Property Office, the disclosure of which is incorporated herein by reference in its entirety.

BACKGROUND OF THE INVENTION

1. Field of the Invention

Methods and apparatuses consistent with the present invention relate to a connecting apparatus, an electronic apparatus and a control method thereof, which communicate with each other by using a wireless network.

2. Description of the Related Art

An electronic apparatus such as a TV or the like has been developed to be connected with an outside device like a video player, a DVD player, a MP3 player, a set-top box and the like for various operations in addition to watching broadcasting programs. Generally, when the outside device is operated, the electronic apparatus connected to the outside device receives a replaying signal from the outside device and outputs an image and/or a sound corresponding to the replaying signal.

In particular, as various outside devices connectable to the electronic apparatus have been developed to meet supply for more various operations, the electronic apparatus needs to include more connecting ports to be connected to the outside devices. However, many connecting ports may result in an unsatisfactory external appearance. Accordingly, for the reason of the external appearance, a built-in structure, etc., the electronic apparatus tends to reduce the number of connecting ports thereof.

Thus, there has been increasing demand for an electronic apparatus that can replay and control an outside device—indirectly connected thereto and can output an image and/or a sound corresponding to a replaying signal when the outside device is replayed, without an additional connecting port.

In addition, when a user inputs a control signal to the electronic apparatus to control the outside device, the electronic apparatus reads information on the outside device such as an apparatus type, a stored content, a device manufacturer, and the like and then controls the outside device based on the read information. Accordingly, there has been increasing requests for an electronic apparatus that can reduce the processing consumption time from input of the user to control of the outside device so as to increase a user's convenience.

SUMMARY OF THE INVENTION

Accordingly, it is an aspect of the present invention to provide a connecting apparatus, an electronic apparatus and a control method thereof, which can receive information on an outside device indirectly-connected thereto which controls the outside device, and can reduce a processing consumption time from input of the user to control of the outside device.

Additional aspects of the present invention will be set forth in part in the description which follows and, in part, will be obvious from the description, or may be learned by practice of the present invention.

The foregoing and/or other aspects of the present invention are achieved by providing a connecting apparatus comprising: at least one connecting unit which connects to an outside device; a first wireless-communicating unit which transmits or receives a wireless signal to or from an electronic apparatus; and a first controller which receives information related to the outside device if the outside device is connected to the connecting unit, and which controls the first wireless-communicating unit to output the information related to the outside device to the electronic apparatus through the first wireless-communicating unit.

According to an aspect of the invention, the first controller outputs the information related to the outside device to the electronic apparatus through the first wireless-communicating unit if the first controller receives the information related to the outside device.

According to an aspect of the invention, the connecting apparatus further comprises a first memory unit; wherein the first controller controls the first memory unit which stores the information related to the outside device therein when the first controller receives the information related to the outside device.

According to an aspect of the invention, the first controller comprises a driver which detects the information related to the outside device, and a sub-controller which controls the driver.

According to an aspect of the invention, the information related to the outside device comprises information of the outside device connected to the connecting unit comprising at least one of a type of the outside device, a number of the outside device, a state of the outside device, a content of the outside device, a node ID in a network, and an outside device manufacturer.

According to an aspect of the invention, a wireless control signal to control the outside device is received from the electronic apparatus, and the first controller outputs a control command signal depending on the wireless control signal to the outside device.

According to an aspect of the invention, the connecting unit comprises at least one of an IEEE 1394 port and a USB port.

Another aspect of the present invention can be also achieved by providing an electronic apparatus comprising: a selecting unit which outputs a control signal according to a selection; a second wireless-communicating unit to transmit or receive a wireless signal including information related to an outside device; a second memory unit to store the information related to the outside device therein; and a second controller which controls the second memory unit to store the information related to the outside device therein when the second wireless signal including the information related to the outside device is received, an to control the second wireless communicating unit which outputs the control signal to a connecting apparatus connected to the outside device if the control signal which controls the outside device is received from the selecting unit.

According to an aspect of the invention, the electronic apparatus further comprises: an output unit which outputs an output signal, wherein the control signal comprises a replaying control signal which replays the outside device, and the controller transmits the replaying signal to the output unit if a replaying signal, output from the outside device while the outside device is replayed based on the replaying control signal, is received through the second wireless communicating unit.

According to an aspect of the invention, the output unit comprises at least one of a display which displays an image and a speaker which outputs sound.

Still another aspect of the present invention can be achieved by providing a method of controlling a connecting apparatus having at least one connecting unit connectable to an outside device, the method comprising: connecting the connecting unit to the outside device; receiving information related to an outside device; and converting the information related to the outside device into wireless data, and outputting the wireless data to an electronic apparatus through a wireless network system.

According to an aspect of the invention, the method further comprises outputting the information related to the outside device to the electronic apparatus through the wireless network system if the information related to the outside device is received.

According to an aspect of the invention, the method further comprises storing the information related to the outside device if the information related to the outside device is received.

According to an aspect of the invention, the information related to the outside device comprises information of the outside device connected to the connecting unit comprising at least one of a type of the outside device, a number of the outside device, a state of the outside device, and a content of the outside device, a node ID in a network, and an outside device manufacturer.

According to an aspect of the invention, the method further comprises receiving a wireless control signal to control the outside device through the wireless network system, and transmitting a control signal to control the outside device according to the wireless control signal to the outside device.

According to an aspect of the invention, the wireless control signal further comprises a replaying control signal, and the method further comprises outputting a replaying signal, output from the outside device while the outside device is replayed based on the replaying control signal, to the electronic apparatus through the wireless network system.

Yet another aspect of the present invention can be achieved by providing a method of controlling an electronic apparatus having a selecting unit to output a control signal according to a selection, the method comprising: receiving a wireless signal including information related to an outside device from a connecting apparatus connectable to the outside device; storing the information related to the outside device; receiving the control signal to control the outside device through the selecting unit; and outputting the control signal to the connecting apparatus through a wireless network system.

BRIEF DESCRIPTION OF THE DRAWINGS

The above and other aspects of the present invention will become apparent and more readily appreciated from the following description of the exemplary embodiments, taken in conjunction with the accompanying drawings of which.

DETAILED DESCRIPTION OF THE EXEMPLARY EMBODIMENTS

Figure 1:
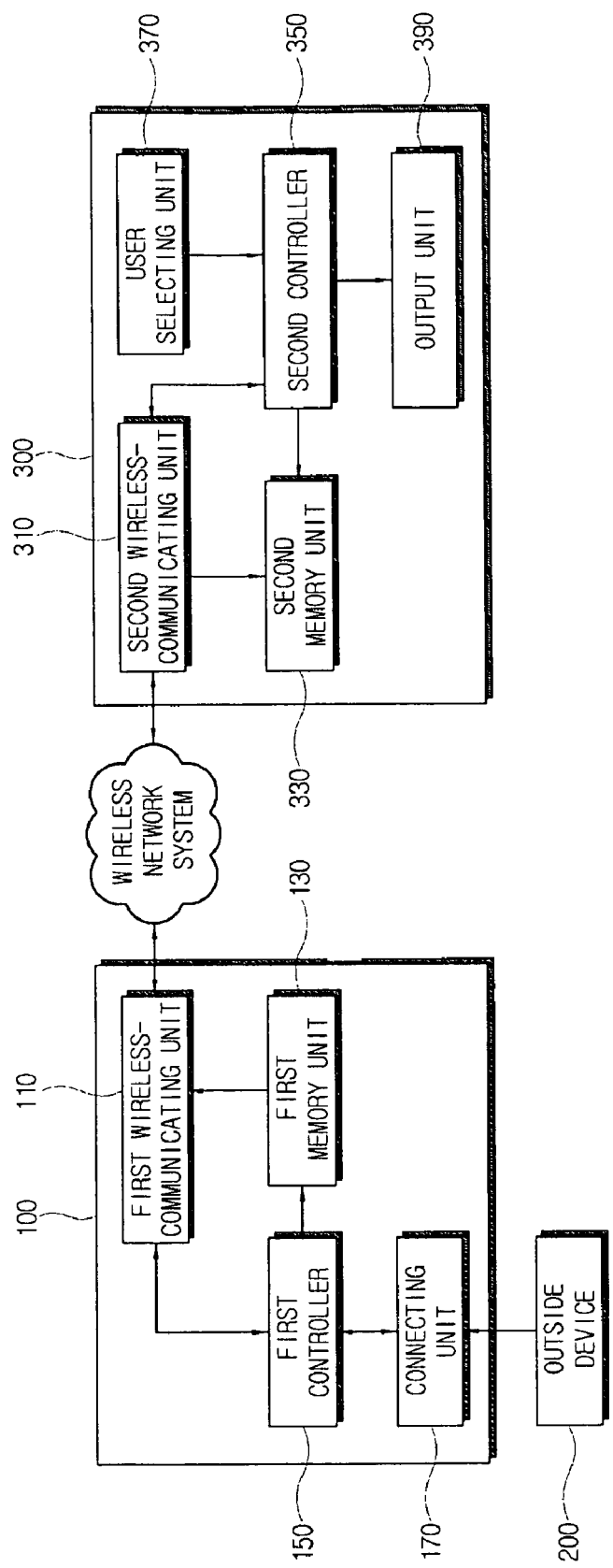
FIG. 1 is a control block diagram of a connecting apparatus and an electronic apparatus according to the exemplary embodiment of the present invention.

Reference will now be made in detail to the exemplary embodiments of the present invention, examples of which are illustrated in the accompanying drawings, wherein like reference numerals refer to like elements throughout.

As shown in FIG. 1, the exemplary embodiment of the present invention includes a connecting apparatus 100 and an electronic apparatus 300.

The connecting apparatus 100 includes a connecting unit 170 to connect at least one outside device 200 thereto, a first wireless-communicating unit 110 to transmit or receive wireless data to or from the electronic apparatus 300 (to be described below), a first memory unit 130, and a first controller 150.

The connecting unit 170 includes a connecting port to connect a predetermined outside device 200 thereto. At this time, at least one connecting port may be provided to connect at least one outside device 200 thereto. The connecting port may include various kinds of connecting ports such as an Institute of Electrical and Electronics Engineers (IEEE) 1394 port, a Universal Serial Bus (USB) port, and/or the like. Further, the connecting unit 170 may include an IEEE 1394 IC for the IEEE 1394 port, a USB IC for the USB port, and/or the like.

The first wireless-communicating unit 110 transmits or receives data to or from a second wireless-communicating unit 310 (to be described below) through a wireless network system. The received/transmitted data may include various data in addition to information on a corresponding outside device 200. For example, the received/transmitted data may include data related to the drive of the outside device 200 and a control signal to control the outside device 200.

The first wireless-communicating unit 110 may transmit or receive data through TCP/IP (Transmission Control Protocol/Internet Protocol) and have a self-assigned IP address. At this time, the first wireless-communicating unit 110 of an exemplary embodiment includes a WLAN (Wireless Local Area Network) card, but is not limited thereto. Alternatively, the first wireless-communicating unit 110 may wirelessly-communicate with the second wireless-communicating unit 310 through any wireless network system.

The first memory unit 130 stores information on the outside device 200 according to control of the first controller 150. At this time, although not necessary, in an exemplary embodiment the first memory unit 130 includes a shared memory to share the stored information with the electronic apparatus 300 (to be described below).

When the outside device 200 is connected to the connecting port of the connecting unit 170, the first controller 150 detects information on the outside device 200. Further, the first controller 150 controls the first wireless-communicating unit 110 to output the detected information on the outside device 200 to the electronic apparatus 300 through the wireless-communicating unit 110. Herein, the first controller 150 according to an exemplary embodiment of the present invention may include a driver 153 to detect the information on the outside device 200, and a sub-controller 151 to control the driver 153 (referring to FIG. 2).

The information, detected by the driver 153, may include at least one among information on the outside devices 200 connected to the connecting port such as a type, a number, a state, and a content of connected devices, a node ID in networks, a device manufacturer, and the like.

Then, the first controller 150 controls the first memory unit 130 to store the information related to the outside device 200 therein. Then, the first controller 150 controls the first wireless-communicating unit 110 to output the stored information in the first memory unit 130 to the electronic apparatus 300. Further, whenever the first controller 150 controls the first memory unit 130 to store the information on the outside device 200 therein or to update it, the first controller 150 may again control the first wireless-communicating unit 110 to output the information or the update thereof to the electronic apparatus 300. On the other hand, when the first controller 150 receives a wireless control signal to control the outside device 200 from the electronic apparatus 300 through the first wireless-communicating unit 110, the first controller 150 transmits a control command signal depending on the wireless control signal to the outside device 200.

The electronic apparatus 300 includes a user selecting unit 370, a second wireless-communicating unit 310, a second memory unit 330, and a second controller 350. Also, the electronic apparatus 300 may include an output unit 390 as necessary.

A user may operate the user selecting unit 370 to output a predetermined key signal to the second controller 350 (to be described below) to input or select a predetermined function. Herein, the user selecting unit 370 may be implemented as a plurality of input keys, a button, a remote controller, a mouse, and/or the like. For example, when a user wants to replay the outside device 200, the user can select a predetermined replaying button to replay the outside device 200.

The second wireless-communicating unit 310 transmits or receives data to or from a first wireless-communicating unit 110 described above through the wireless network system. Similarly, the received/transmitted data may include various data in addition to information on the corresponding outside device 200. For example, the received/transmitted data may include data related to the driver of the outside device 200 and a control signal to control the outside device 200. At this time, the second wireless-communicating unit 310 transmits or receives the data in the same format to or from a first wireless-communicating unit 110. The second wireless-communicating unit 310 of an exemplary embodiment includes the WLAN card, but is not limited thereto. Alternatively, the second wireless-communicating unit 310 may wirelessly-communicate with the first wireless-communicating unit 110 through any wireless network system.

The second memory unit 330 stores information on the outside device 200. In an exemplary embodiment, the second memory unit 330 includes a shared memory to share the stored information with the connecting apparatus.

In the electronic apparatus 300 according to an exemplary embodiment of the present invention, the output unit 390 includes at least one of a display 391 to display an image and a speaker 395 to output a sound.

When the second controller 350 receives a wireless data signal including the information on the outside device 200 through the second wireless-communicating unit 310, the second controller 350 controls the second memory unit 330 to store the information on the outside device 200 therein. Also, the second controller 350 may receive a control signal to control the outside device 200 through the user selecting unit 370. Then, the second controller 350 outputs the control signal to the connecting apparatus 100 through the second wireless-communicating unit 310.

Further, in the case that the outside device 200 performs an operation according to a user input, etc., when the second controller 350 receives data including information corresponding to the operation through the second wireless-communicating unit 310, the second controller 350 outputs the data to the output unit 390. For example, when the second controller 350 receives a replaying control signal to replay the outside device 200 through the user selecting unit 370, the second controller 350 outputs the replaying control signal to the connecting apparatus 100 through the second wireless-communicating unit 310, to thereby replay the outside device 200 connected to the connecting apparatus 100. Then, the connecting apparatus 100 transmits a replaying signal according to the replay of the outside device 200 to the electronic apparatus 300 through the first wireless-communicating unit 110. The second controller 350 receives the replaying signal through the second wireless-communicating unit 310 and controls the output unit 390 to output the replaying signal.

Further, the electronic apparatus 300 transmits the replaying control signal to replay the outside device 200 to the connecting apparatus 100, to thereby replay the outside device 200. At this time, the connecting apparatus 100 transmits information on the outside device 200 such as device state to inform that the outside device 200 is in a replaying mode at present, for example, as well as the replaying signal according to the replay of the outside 200 to the electric apparatus 300.

In addition, when the first controller 150 recognizes that the outside device 200 is connected to the connecting unit 170, the first controller 150 controls the sub-controller 151 to drive the driver 153 to detect information of the outside device 200 and then controls the first memory unit 130 to store the detected information therein to share it with the electronic apparatus 300. Here, whenever the first memory unit 130 writes the information of the outside device 200 therein, the first controller 150 transmits the information written in the first memory unit 130 to the electronic apparatus 300 in real time through the wireless network system to synchronize with the second memory unit 330. Then, the second controller 350, which receives the information transmitted from the connecting apparatus 100, controls the second memory unit 330 to store the transmitted information therein in real time.

When the replaying control signal to replay the outside device 200 is input to the second controller 350 through the user selecting unit 370, the second controller 350 reads the information stored in the second memory unit 350. Then, as described above, the second controller 350 transmits the input replaying control signal to the connecting apparatus 100 through the second wireless-communicating unit 330. Accordingly, the first controller 150 of the connecting apparatus 100, in particular the sub-controller 151, analyzes the replaying control signal and transmits a replaying command based on the replaying control signal to the outside device 200. Thus, the outside device 200 that has received the replaying command would be replayed, and the state of the outside device 200 would be in a replaying mode. At this time, the first controller 150 recognizes that the state of the outside device 200 has been converted into the replaying mode and then controls the first memory unit 130 to update the information on the converted state of the outside device 200 therein. Thus, the information stored in the second memory unit 330 can be updated in real time in the same ways as described above.

In addition, when a turn-off control signal to turn off the outside device 200 is input into the second controller 350 through the user selecting unit 370, in the same ways, the second controller 350 transmits the turn-off control signal to the connecting apparatus 100, to thereby turn off the outside device 200.

Figure 2:
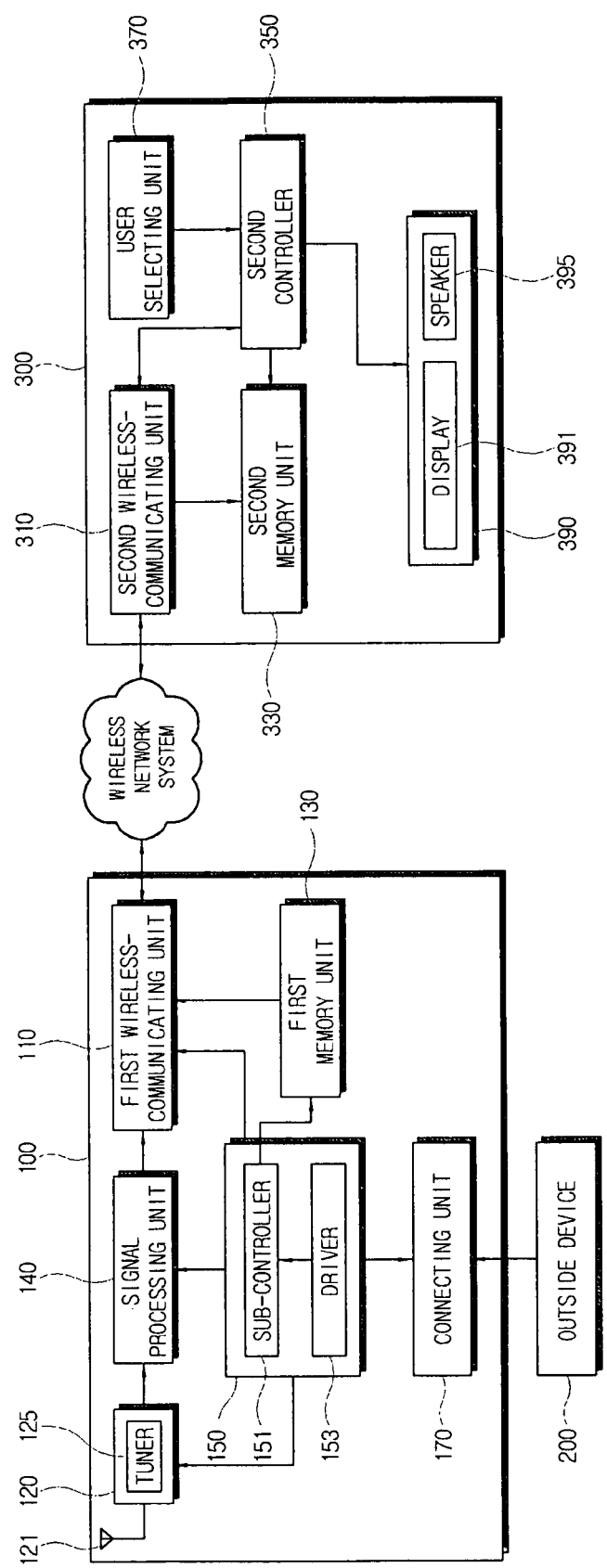
FIG. 2 is another control block diagram of a connecting apparatus and an electronic apparatus according to an exemplary embodiment of the present invention, where the connecting apparatus is a set top box, and the electronic apparatus is a TV, for example.

FIG. 2 illustrates a connecting apparatus 100 employing a set top box and an electronic apparatus 300 employing a TV according to an exemplary embodiment of the present invention, for example. However, the present invention is not limited to this exemplary embodiment. Alternatively, the connecting apparatus 100 and the electronic apparatus 300 may employ any means to wirelessly-communicate with each other. Here, the connecting apparatus 100 should include the connecting unit 170 that is connectable to the outside device 200.

The exemplary embodiment of the present invention according to the FIG. 2 will be described as follows. Components in FIG. 2 that overlap with those in FIG. 1 will have the same reference numbers, and the overlapping description thereof will be omitted.

The connecting apparatus 100 according to the exemplary embodiment of the present invention in accordance with FIG. 2 may further include a signal receiving unit 120 and a signal processing unit 140.

The signal receiving unit 120 receives a broadcasting signal from an outside source, such as a broadcasting station, through an antenna 121. Herein, the signal receiving unit 120 includes a tuner 125 and a demodulator (not shown). The tuner 125 tunes the broadcasting signals received through the antenna 121 to a channel selected according to a tuning control signal of the first controller 150. The demodulator (not shown) demodulates the predetermined broadcasting signal tuned by the tuner 125 and corrects an error therein to provide it by a format of a transport stream to the signal processing unit 140.

The signal processing unit 140 processes the predetermined broadcasting signal provided from the signal receiving unit 120 to output it so that the output unit 390 of the electronic apparatus 300 can output the predetermined broadcasting signal. Also, the signal processing unit 140 processes a signal output from the outside device 200.

In particular, the signal processing unit 140 may include a demultiplexer, a decoder, and a signal processor, which are not shown.

The demultiplexer separates the broadcasting signal provided by a format of a transport stream into an audio signal and a video signal, and a data including necessary information to output them to the decoder. The decoder decodes the audio and video signals and the date to output them to the signal processor.

The signal processor processes the audio signal and video signal to provide them to the first wireless-communicating unit 110 so that the display 391 and the speaker 395 of the electronic apparatus 300 can output the audio signal and video signal, respectively. Also, when an additional signal such as a replaying signal output from the outside device 200 is necessary to be output to the output unit 390, the signal processor processes the additional signal so that the output unit 390 can output the additional signal.

Additionally, there is provided the second controller 350 that can control the broadcasting signal and/or the additional signal of the outside device 200 which are provided from the connecting apparatus 100, as necessary.

Accordingly, the second controller 350 may control the speaker 395 of the output unit 390 to output a sound corresponding to the broadcasting signal and/or the additional signal applied from the outside device 200. The second controller 350 may also control the display 391 of the output unit 390 to display an image corresponding to the broadcasting signal and/or the additional signal applied from the outside device 200.

Further, the display 391 may include a display module (not shown) to display an image corresponding to the broadcasting signal and/or the additional signal applied from the outside device 200, and a module driving unit (not shown) to drive the display module (not shown). Here, the display module (not shown) may include various modules such as a DLP Digital Light Processing (DLP) module, an Liquid Crystal Display (LCD) module, a Plasma Display Panel (PDP) module, and the like.

Figure 3:
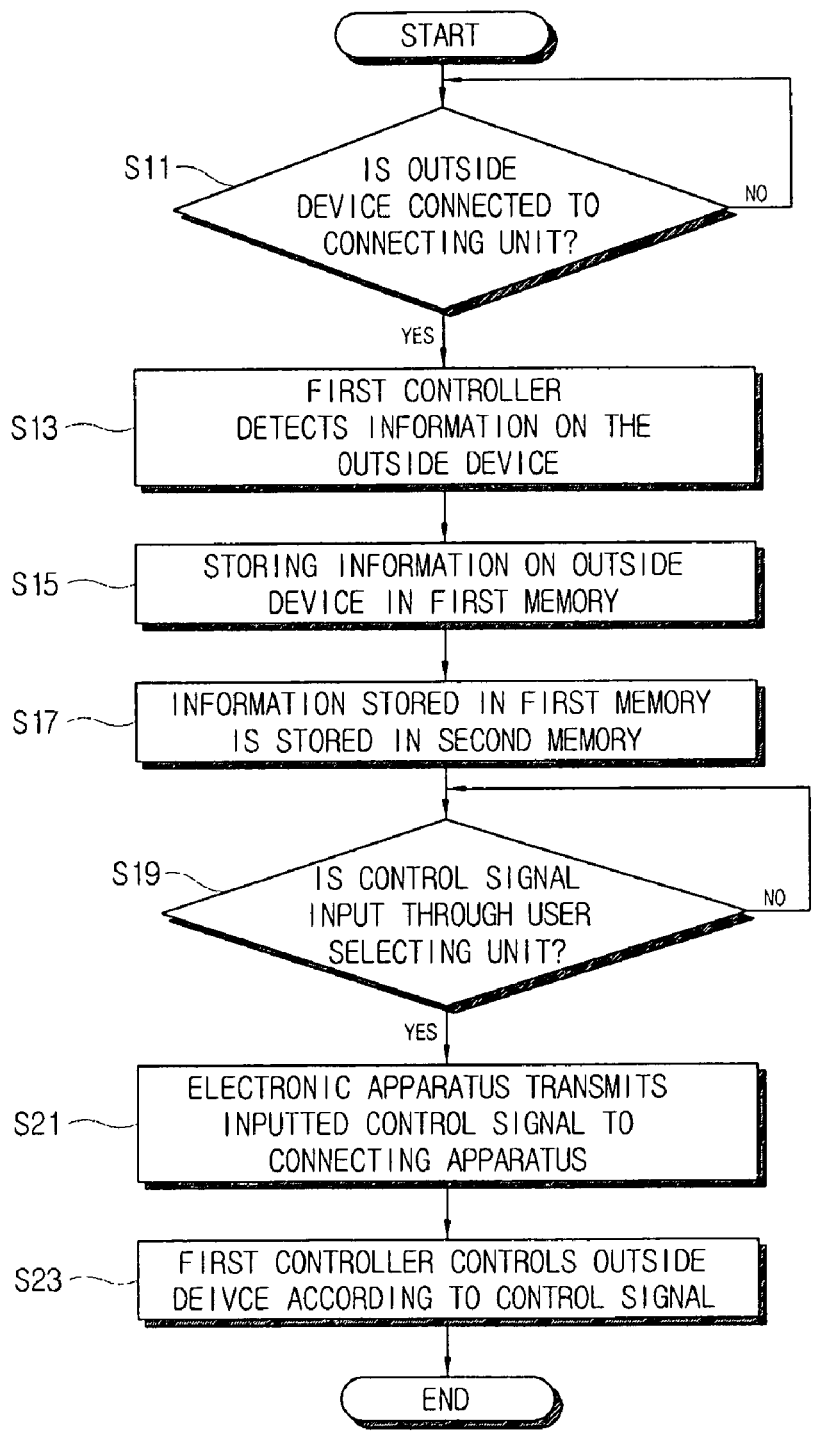
FIG. 3 is a control flowchart of the connecting apparatus and the electronic apparatus according to the exemplary embodiment of the present invention.

FIG. 3 is a control diagram of a connecting apparatus 100 and an electronic apparatus 300 according to an exemplary embodiment of the present invention. Each operation of the connecting apparatus 100 and the electronic apparatus 300 according to the exemplary embodiment of the present invention will be described with reference to FIG. 3.

As shown therein, at least one outside device 200 may be connected to the connecting unit 170 of the connecting apparatus 100 according to the exemplary embodiment of the present invention. Herein, the connecting unit 170 may include at least one connecting port to be connected to at least one outside device 200.

When the outside device 200 is connected to the connecting unit 170 of the connecting apparatus 100, which is physically separated from the electronic apparatus 300 (in operation S11), the driver 153 provided in the first controller 150 detects information on the outside device 200 (in operation S13). The first controller 150 controls the first memory unit 130 to store the detected information on the outside device 200 (in operation S15).

Whenever the first memory unit 130 stores the information on the outside device 200 therein, the first memory unit 130, in real-time, outputs the information stored in the first memory unit 130 to the electronic apparatus 300 through the wireless network system in order to synchronize with the second memory unit 330. Accordingly, the information stored in the first memory unit 130 is stored in real time in the second memory unit 330 (in operation S17).

When a control signal to control the outside device 200 is input to the second controller 350 through the user selecting unit 370 of the electronic apparatus 300 (in operation S19), the second controller 350 controls the wireless-communicating unit 310 to output the control signal to the connecting apparatus 100 (in operation S21). Thus, a user can control the outside device 200 indirectly-connected to the connecting apparatus 100 through the user selecting unit 370 of the electronic apparatus 300 (in operation S23).

For example, in the case that the outside device 200 is a DVD player, a user may input the replaying control signal to replay the DVD player through the user selecting unit 370. At this time, the second controller 350 outputs the replaying control signal to the connecting apparatus 100. Then, the connecting apparatus 100 replays the outside device 200 based on the replaying control signal. The connecting apparatus 100 also outputs a DVD replaying signal output from the outside device 200 to the electronic apparatus 300 through the first wireless-communicating unit 110 while the outside device 200 is replayed. Then, the electronic apparatus 300 receives the DVD replaying signal through the second wireless-communicating unit 310 to output it to the output unit 390. Thus, an image and a sound corresponding to the DVD replaying signal can be output to the display 391 and the speaker 395, respectively.

In addition, when a user inputs a stopping control signal to stop replaying the DVD player through the user selecting unit 370, the second controller 350 outputs the stopping control signal to the connecting apparatus 100. Thus, in the same ways, the connecting apparatus 100 can stop replaying the DVD player.

As described above, the first memory unit 130 and the second memory unit 330, respectively may include a shared memory to share data in real time including information on the outside device 200, such as a device type and a device state, with each other. Depending on this shared memory, the connecting apparatus 100 and the electronic apparatus 300, which are physically separated from each other, can be operated as one system by sharing the information on the outside device 200.

As apparent from the above description, according to the exemplary embodiment of the present invention, an electronic apparatus can control an outside device, which is indirectly connected thereto but is directly connected to a connecting apparatus physically separated from the electronic apparatus, by transmitting or receiving data including information on the outside device, and the like to or from the connecting apparatus through a wireless network system.

Further, a reading consumption time can be reduced when the electronic apparatus reads information from the outside device due to a wireless network system between the electronic apparatus and the connecting apparatus.

Also, a controlling consumption time can be reduced when the electronic apparatus controls the outside device, by allowing a second memory unit to update the data therein, in real time, whenever a first memory unit updates the data therein.

Although a few exemplary embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A connecting apparatus, comprising:
    at least one connecting unit connectable to an outside device which provides content;
    a wireless-communicating unit which is operable to receive a wireless control signal from an electronic apparatus and operable to transmit a first wireless signal and a second wireless signal to the electronic apparatus; and
    a controller operable to detect first information, which is related to the content provided by the outside device if the outside device is connected to the connecting unit, and second information, which is related to a state of the outside device, and operable to control the wireless-communicating unit to output the detected first and second information to the electronic apparatus,
    wherein if the first information is detected, the controller controls the wireless-communicating unit to transmit the first wireless signal including the first information to the electronic apparatus, and if a wireless control signal which controls an operation of the outside device based on a user selection is received from the electronic apparatus after transmitting the first wireless signal, the controller outputs a control command signal based on the wireless control signal to the outside device, and if the second information is detected after outputting the control command signal, the controller controls the wireless-communicating unit to transmit the second wireless signal including the second information to the electronic apparatus.

2. The connecting apparatus according to claim 1, further comprising:
    a memory unit, wherein the controller controls the memory unit to stores the first and second information.

3. The connecting apparatus according to claim 2, wherein the memory unit stores the first and second information, as received in real time from the connecting apparatus.

4. The connecting apparatus according to claim 1, wherein the controller comprises a driver which detects the first and second information, and a sub-controller which controls the driver.

5. The connecting apparatus according to claim 1, wherein the connecting unit comprises at least one of an IEEE 1394 port and a USB port.

6. The connecting apparatus according to claim 1, wherein the operation comprises a playing operation for playing the content on the outside device.

7. An electronic apparatus, comprising:
    a user selecting unit which outputs a control signal according to a selection by a user, wherein the control signal controls an operation of an outside device which provides content;
    a wireless-communicating unit operable to wirelessly transmit the control signal output by the user selecting unit to a connecting apparatus, and operable to receive a first wireless signal and a second wireless signal from the connecting apparatus, the first wireless signal comprising first information related to the content provided by the outside device, the second wireless signal comprising second information related to a state of the outside device;
    an output unit operable to output at least one of an image and a sound, wherein the at least one of the image and sound is based on the second information;
    a memory unit which stores the information; and
    a controller operable to control the output unit to output the at least one of the image and the sound, and operable to control the wireless communicating unit to wirelessly transmit the control signal controlling the operation of the outside device to the connecting apparatus,
    wherein if the first wireless signal comprising the first information is received from the connecting apparatus through the wireless-communicating unit and if the selection is received from the selecting unit, the controller controls the wireless-communicating unit to wirelessly transmit the control signal to the connecting apparatus, and if the second wireless signal comprising the second information is received from the connecting apparatus through the wireless-communicating unit, the controller controls the output unit to output the at least one of the image and the sound.

8. The electronic apparatus according to claim 7, further comprising a memory unit, wherein the memory unit stores the first and second information, as received in real time from the connecting apparatus.

9. The electronic apparatus according to claim 7, wherein the operation comprises a playing operation for playing the content on the outside device.

10. A method of controlling a connecting apparatus having at least one connecting unit connectable to an outside device which provides content, the method comprising:
    connecting the connecting unit to the outside device;
    receiving detecting first information, which is related to content provided by the outside device;
    converting the detected first information into first wireless data;
    outputting the first wireless data to an electronic apparatus through a wireless network;
    receiving a wireless control signal from the electronic apparatus, wherein the wireless control signal is based on a user selection;
    outputting a control command signal to the outside device, wherein the control command signal is based on the received wireless control signal and controls an operation of the outside device;
    detecting second information, which is related to a state of the outside device, after outputting the control command signal; and
    converting the detected second information into second wireless data; and outputting the second wireless data to the to the electronic apparatus.

11. The method according to claim 10, wherein the operation comprises a playing operation for playing the content on the outside device.

12. A method of controlling an electronic apparatus including a selecting unit to output a control signal according to a user selection and an output unit to output at least one of an image and a sound, the method comprising:

receiving from a connecting apparatus a first wireless signal comprising first information related to content provided by an outside device;

receiving the control signal according to the user selection received through the selecting unit, wherein the control signal is operable to control an operation of the outside device according to the user selection;

outputting the control signal to the connecting apparatus through a wireless network system;

executing, by the outside device, a predetermined function corresponding to the received control signal;

receiving from the connecting apparatus, after outputting the control signal, a second wireless signal comprising second information related to a state of the outside device; and outputting through the output unit the at least one of the image and the sound, wherein the at least one of the image and the sound is based on the second information.

13. The method according to claim 12, wherein the operation comprises a playing operation for playing the content on the outside device.

* * * * *